3,329,584
PURIFICATION OF GERMANIUM TETRA-CHLORIDE WITH ADDED AMMONIUM HYDROXIDE

Emil J. Mehalchick, Towanda, Pa., assignor to Sylvania Electric Products Inc., a corporation of Delaware
No Drawing. Filed Aug. 20, 1963, Ser. No. 303,438
2 Claims. (Cl. 203—36)

This invention relates to a method for purifying germanium tetrachloride. More particularly, it is concerned with a purification method which makes possible the reduction of the content of the usual impurities in germanium tetrachloride below the level normally achieved by the heretofore commonly employed technique of extractive distillation with hydrochloric acid.

Germanium tetrachloride is useful as an intermediate in the production of germanium employed in the manufacture of semiconductor devices. As used for the active crystal elements of such devices, the germanium normally contains as impurities small quantities of one or more chemical elements. The presence of these impurities is quite commonly desired to afford required electrical characteristics in the germanium. However, even in such cases, in the interest of obtaining predetermined and reproducible characteristics in the germanium, it is preferred first to obtain germanium in a high state of purity, and subsequently to add the impurities, or "dope," the germanium in a controlled fashion.

Although a substantial degree of purification of elemental germanium can be accomplished by the familiar zone refining technique, it has been recognized as desirable to purify the intermediate germanium tetrachloride to as great an extent as possible prior to the steps of converting the germanium tetrachloride to germanium dioxide and then to elemental germanium. The impurities present in the germanium tetrachloride vary, particularly where the germanium-containing starting material from which the germanium tetrachloride is derived includes returned waste germanium from semiconductor device manufacturing operations. Typically the germanium tetrachloride may contain chlorides of the elements aluminum, boron, arsenic, copper, phosphorus, and other elements derived from the original ore, the waste material reprocessed, or from the reagents employed or equipment in which the germanium tetrachloride is produced.

In the purification of germanium tetrachloride it has been common practice to subject the compound to an extractive distillation operation. A typical procedure for carrying out this operation involves distilling the germanium tetrachloride from a vessel in the presence of concentrated hydrochloric acid saturated with chlorine, the chlorine being passed continuously through the vessel during the distillation. The germanium tetrachloride is substantially insoluble in the hydrochloric acid and forms a lower layer in the distillation vessel. The chlorides of the impurity elements tend to remain in the hydrochloric acid layer as the germanium tetrachloride is distilled off. The operation may be repeated two or more times using fresh concentrated hydrochloric acid with each treatment, and in a final operation the germanium tetrachloride is distilled in the absence of hydrochloric acid. When the distillation is carried out at atmospheric pressure, the fraction which distills in this final operation at about 83.5° C. is collected for subsequent conversion to elemental germanium.

Although the above-described process has been widely used with some degree of success, there have been definite limitations on the degree of purity of the germanium tetrachloride produced. These limitations have been imposed by the fact that chlorides of many of the impurity elements are sufficiently volatile so that measurable amounts are distilled over with the germanium tetrachloride. In addition, impurities may be entrained with the germanium tetrachloride vapors passing from the still. Still further, the substantial quantities of hydrochloric acid employed may contribute to, rather than reduce, the content of certain of the impurities sought to be removed by the process.

In the method of the present invention the germanium tetrachloride is treated with a small quantity of an aqueous alkaline material and is thereafter distilled, the distillate constituting the desired purified product. The treatment with alkaline material hydrolyzes a small quantity of the germanium tetrachloride to form germanium oxide, $GeO_2$. In addition, some hydrolysis of the chlorides of the impurity elements which are present may occur, with the formation of the corresponding oxides. This hydrolysis is particularly likely to occur with respect to those chlorides of impurities such as aluminum which are more readily hydrolyzed than germanium tetrachloride. The germanium oxide and any oxides of impurities are insoluble in the germanium tetrachloride, and non-volatile under the conditions of the method of the present invention. Thus the subsequent distillation of the germanium tetrachloride can be accomplished with substantially less problem than heretofore with any carry-over of the impurity elements into the distillate.

In some cases, the chlorides of the particular impurity elements contaminating the germanium tetrachloride are less readily hydrolyzed than the germanium tetrachloride. However, it is conjectured that in those cases where unhydrolyzed chlorides of impurities remain prior to the distillation they associate themselves in some manner with the insoluble germanium oxide, possibly by adsorption, so that their tendency to pass from the still during the distillation operation is remarkably reduced.

Various alkaline materials may be employed in the treatment of the germanium tetrachloride. For example, aqueous solutions of the various alkali and alkaline earth metal hydroxides such as, for example, lithium, potassium, sodium, calcium and barium hydroxides, added in small quantities, will effectively hydrolyze germanium tetrachloride and the chlorides of the impurity elements. Ammonium hydroxide, however, is preferred over the abovementioned alkaline reagents for the reason that the ammonium chloride which is produced as a by-product of the treatment is relatively easy to volatilize. Thus if any slight amount is carried over with the germanium tetrachloride it is readily removed incidental to any subsequent preparation of germanium from the purified germanium tetrachloride. If the metal ions of the previously mentioned alkaline and alkaline earth metals can be tolerated in the ultimate purified germanium tetrachloride, such alkaline materials could be employed in lieu of ammonium hydroxide.

Although the alkaline solutions may be employed in a fairly wide range of concentrations it is preferred to use solutions of higher concentrations. Solutions of lower concentrations tend to permit re-dissolving of the oxides of germanium and the impurity elements during distillation of the germanium tetrachloride. It has been found that ammonium hydroxide solution containing about 14% by weight of $NH_4OH$ is particularly suitable for the treatment described above.

The quantity of alkaline material added to the germanium tetrachloride is not extremely critical. However, the addition of excessive quantities of alkaline material causes the needless conversion of germanium tetrachloride to the oxide. The most desirable amount may readily be determined for a germanium tetrachloride of any particular impurity level by analysis of the purified product. Generally, in using ammonium hydroxide of about 14% strength it is preferred to use between about 0.5% and about 1.5% of the volume of germanium tetrachloride treated.

As an example of the operation of the method hereinabove described, a batch of germanium tetrachloride containing aluminum in an amount of the order of 1 part per million by weight was treated by the addition in dropwise fashion of about 1 volume percent of 14% ammonium hydroxide solution. The ammonium hydroxide was added over a period of about one hour and the germanium tetrachloride was agitated with a mechanical stirrer during the entire period. At the conclusion of this treatment the germanium tetrachloride was carefully distilled at atmospheric pressure, the fraction distilling at 83.5° C. being collected as the purified product of the method. Analysis of the purified germanium tetrachloride indicated an aluminum content of less than 2 parts per billion.

Elemental germanium was prepared from the above purified material. An ingot of this germanium displayed a resistivity profile of 20 to 30 ohm centimeters. An ingot of germanium prepared from the germanium tetrachloride prior to the treatment with ammonium hydroxide showed a resistivity profile of only 10 to 15 ohm centimeters. Both germanium specimens were of N-type, indicating that the treatment removed not only aluminum, but substantial amounts of N-type impurities as well.

As a further illustration of the effectiveness of the present method, a batch of germanium tetrachloride which had been purified by multiple distillations to the extent that no detectable amounts of aluminum, arsenic or phosphorus were present, was "doped" with known quantities of chlorides of these impurity elements. Specifically, the initial batch of "doped" germanium tetrachloride contained the impurities in the concentration indicated in Column 1 of Table I, below. All values in Table I are in terms of percent by weight of the germanium tetrachloride.

TABLE I

|    | 1     | 2      |
|----|-------|--------|
| Al | 0.005 | 0.0049 |
| As | 0.4   | 0.385  |
| P  | 0.2   | 0.199  |

The batch of germanium tetrachloride was placed in a distillation vessel and ammonium hydroxide of 14% strength was added slowly, with agitation of the batch. The amount of ammonium hydroxide added was about 1% of the volue of the batch of germanium tetrachloride. Insoluble material including germanium oxide, oxides of the impurity elements and occluded or adsorbed chlorides of the impurities appeared in the germanium chloride as a result of the hydrolyzing action of the ammonium hydroxide. The germanium tetrachloride was then distilled at atmospheric pressure, the fraction boiling at 83.5° C. being reserved for further treatment described below. The small amount of residue remaining in the still was heated sufficiently to drive off the ammonium chloride by-product of the treatment, and the residue was then analyzed for the impurity elements. The amounts of the various impurities in the residue, measured as percentages of the "doped" germanium tetrachloride treated, are shown in Column 2 of Table I.

From a comparison of Columns 1 and 2 it can be seen that a substantial reduction in the impurity content of the germanium tetrachloride is realized by a single treatment in accordance with the method of the invention. Furthermore, since the only reagent added was the small amount of ammonium hydroxide necessary for the partial hydrolysis, there was substantially no introduction of additional impurities into the system.

It will be understood that various modifications of the method as hereinabove described may be employed without departing from the true scope and spirit of the invention. For example, rather than adding ammonium hydroxide solution slowly to the germanium tetrachloride, a mixture of ammonia gas, water vapor and a carrier gas such as, for example, nitrogen or argon may be bubbled through the germanium tetrachloride in the vessel in which the hydrolysis is accomplished. In such case, the total amount of ammonia and water vapor admitted should be sufficient, and in such relative proportions, as to constitute the chemical equivalent of the amounts of concentrated ammonium hydroxide recommended above.

The amount of germanium tetrachloride converted to germanium oxide as a result of the hydrolysis treatment represents a rather nominal reduction in the yield of purified germanium tetrachloride. However, if it is desired to maximize the over-all yield of a process including the method of the present invention, the solid residue remaining in the distillation vessel, after the purified germanium tetrachloride has been distilled off, may be incorporated with germanium ore or other source of germanium material employed for producing lower purity germanium tetrachloride.

In some cases it may be desired to employ the process hereinabove described as a final purification process following preliminary known purification measures. In this way the full capability of the present method for removing even small quantities of impurity materials in a single operation may be used to full advantage. For example, a batch of germanium tetrachloride of ordinary commercial grade may first be subjected to two successive distillations in the presence of hydrochloric acid saturated with chlorine in the manner which has been previously employed in the art, followed by the hydrolysis and distillation operations described in this application.

What is claimed is:

1. The method of purifying germanium tetrachloride containing chlorides of impurity elements which comprises slowly adding ammonium hydroxide of about 14% concentration to a batch of said germanium tetrachloride, the amount of ammonium hydroxide so added being approximately 1% by volume of said batch, and simultaneously agitating the batch to cause hydrolysis of a small portion of the germanium tetrachloride in said batch and precipitation of a small amount of germanium oxide, and thereafter distilling the resulting mixture at atmospheric pressure and recovering the fraction boiling at about 83.5° C. as purified germanium tetrachloride.

2. The method of purifying germanium tetrachloride which comprises slowly adding to the germanium tetrachloride, ammonium hydroxide solution containing about 14% ammonium hydroxide in an amount between about 0.5% and about 1.5% of the volume of the germanium tetrachloride and simultaneously agitating the germanium tetrachloride to cause hydrolysis of a small portion thereof, and precipitation of a small quantity of germanium oxide, and thereafter distilling the germanium tetrachloride leaving the germanium oxide as a residue of the distillation.

References Cited

UNITED STATES PATENTS

| 2,204,956 | 6/1940 | Bresler et al. | 203—29 |
| 2,370,525 | 2/1945 | De Witt | 23—87 |
| 2,396,458 | 3/1946 | Cole et al. | 203—29 X |
| 2,598,897 | 6/1952 | Espenschied | 203—36 |

FOREIGN PATENTS

| 866,039 | 4/1961 | Great Britain. |

OTHER REFERENCES

The Trans Electrochemical Society, vol. 89, 1946, pages 280–281, Germanium Recovery, by Jaffee et al.

NORMAN YUDKOFF, *Primary Examiner.*

F. E. DRUMMOND, *Assistant Examiner.*